United States Patent
Xu (10) Patent No.: US 10,464,135 B2
(45) Date of Patent: Nov. 5, 2019

(54) ADDITIVE MANUFACTURING METHOD FOR THE ADDITION OF FEATURES WITHIN COOLING HOLES

(71) Applicant: United Technologies Corporation, Hartford, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 847 days.

(21) Appl. No.: 14/771,436

(22) PCT Filed: Mar. 11, 2014

(86) PCT No.: PCT/US2014/023393
§ 371 (c)(1),
(2) Date: Aug. 28, 2015

(87) PCT Pub. No.: WO2014/150490
PCT Pub. Date: Sep. 25, 2014

(65) Prior Publication Data
US 2016/0008889 A1  Jan. 14, 2016

Related U.S. Application Data

(60) Provisional application No. 61/790,122, filed on Mar. 15, 2013.

(51) Int. Cl.
| | | |
|---|---|---|
| *B22F 7/08* | (2006.01) | |
| *B23K 26/342* | (2014.01) | |
| *B23K 15/00* | (2006.01) | |
| *B23K 26/00* | (2014.01) | |

(Continued)

(52) U.S. Cl.
CPC ............ *B22F 7/08* (2013.01); *B23K 15/0086* (2013.01); *B23K 15/0093* (2013.01);
(Continued)

(58) Field of Classification Search
CPC ... B22F 7/08; B23K 26/0006; B23K 15/0093; B23K 26/342; B23K 15/0086; B28B 1/001; F01D 9/065; F01D 5/186; F23R 3/002
(Continued)

(56) References Cited

U.S. PATENT DOCUMENTS

| | | | |
|---|---|---|---|
| 6,210,488 B1 | 4/2001 | Bruce | |
| 6,368,060 B1 * | 4/2002 | Fehrenbach | ............ F01D 5/186 416/97 A |

(Continued)

OTHER PUBLICATIONS

International Searching Authority, PCT Notification of Transmittal of the International Search Report and the Written Opinion, dated Jul. 10, 2014, 6 pages provided
(Continued)

*Primary Examiner* — Ibrahime A Abraham
*Assistant Examiner* — Elizabeth M Sims
(74) *Attorney, Agent, or Firm* — Kinney & Lange, P.A.

(57) ABSTRACT

A method for forming a diffusion cooling hole in a substrate includes removing material from the substrate to form a metering section having an inlet on a first side of the substrate and removing material from the substrate to form a diffusing section that extends between the metering section and an outlet located on a second side of the substrate generally opposite the first side. The method also includes forming a feature on a substrate surface within one of the metering section and the diffusing section. Forming the feature includes depositing a material on the substrate surface and selectively heating the material to join the material with the substrate surface and form the feature.

7 Claims, 5 Drawing Sheets

(51) Int. Cl.
  *B28B 1/00* (2006.01)
  *F01D 5/18* (2006.01)
  *F01D 9/06* (2006.01)
  *F23R 3/00* (2006.01)
  *B33Y 10/00* (2015.01)
  *B33Y 40/00* (2015.01)
  *B23K 103/02* (2006.01)
  *B23K 101/00* (2006.01)
  *B23K 103/08* (2006.01)
  *B23K 103/00* (2006.01)

(52) U.S. Cl.
  CPC ........ *B23K 26/0006* (2013.01); *B23K 26/342* (2015.10); *B28B 1/001* (2013.01); *F01D 5/186* (2013.01); *F01D 9/065* (2013.01); *F23R 3/002* (2013.01); *B23K 2101/001* (2018.08); *B23K 2103/02* (2018.08); *B23K 2103/08* (2018.08); *B23K 2103/52* (2018.08); *B33Y 10/00* (2014.12); *B33Y 40/00* (2014.12); *F05D 2230/10* (2013.01); *F05D 2230/12* (2013.01); *F05D 2230/13* (2013.01); *F05D 2230/14* (2013.01); *F05D 2230/31* (2013.01); *F05D 2240/11* (2013.01); *F05D 2240/81* (2013.01); *F05D 2260/202* (2013.01); *F05D 2260/2214* (2013.01); *F05D 2260/22141* (2013.01); *F23R 2900/00018* (2013.01); *F23R 2900/03042* (2013.01)

(58) Field of Classification Search
  USPC .................................................. 219/121.85
  See application file for complete search history.

(56) References Cited

U.S. PATENT DOCUMENTS

| 7,997,868 | B1 | 8/2011 | Liang | |
| 2005/0079368 | A1* | 4/2005 | Gorman | C23C 4/02 428/469 |
| 2005/0123401 | A1* | 6/2005 | Bunker | F01D 5/186 416/97 R |
| 2010/0040459 | A1 | 2/2010 | Ohkita | |
| 2011/0143042 | A1* | 6/2011 | Peretti | B23K 9/04 427/455 |
| 2011/0293423 | A1* | 12/2011 | Bunker | F01D 5/186 416/95 |
| 2012/0167389 | A1* | 7/2012 | Lacy | B23P 6/002 29/889.1 |
| 2013/0045106 | A1* | 2/2013 | Lacy | F01D 5/186 416/237 |

OTHER PUBLICATIONS

Extended European Search Report for Application No. 14767556.5, dated Sep. 20, 2016, 7 Pages.

Chinese Office Action for Application No. 201480015993.8, dated Sep. 1, 2016, 20 pages provided.

Zhang Hongsong et al., "Application of Thermal-Spraying and Electron Beam Physical Vapor Deposition Technologies in Preparation of Thermal Barrier Coatings," Department of Mechanical Engineering, Materials Review, vol. 23, vol. 7, Jul. 15, 2009, pp. 98-101.

* cited by examiner

ADDITIVE MANUFACTURING METHOD FOR THE ADDITION OF FEATURES WITHIN COOLING HOLES

This application claims priority to U.S. Provisional Application No. 61/790,122, filed on Mar. 15, 2013, and entitled "Additive Manufacturing Method for the Addition of Features within Cooling Holes," the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vanes, platforms, blade outer air seals (BOAS), shrouds and compressor and turbine casings, combustor liners, turbine exhaust assemblies, thrust augmentors and exhaust nozzles.

Gas turbine engine performance depends on the balance between pressure ratios and core gas path temperatures and the related effects on service life and reliability due to stress and wear. This balance is particularly relevant to gas turbine engine components in the compressor, combustor, turbine and exhaust sections, where active cooling may be required to prevent damage due to high gas path temperatures.

SUMMARY

A method for forming a diffusion cooling hole in a substrate includes removing material from the substrate to form a metering section having an inlet on a first side of the substrate and removing material from the substrate to form a diffusing section that extends between the metering section and an outlet located on a second side of the substrate generally opposite the first side. The method also includes forming a feature on a substrate surface within one of the metering section and the diffusing section. Forming the feature includes depositing a material on the substrate surface and selectively heating the material to join the material with the substrate surface and form the feature.

DETAILED DESCRIPTION

Figure 1:
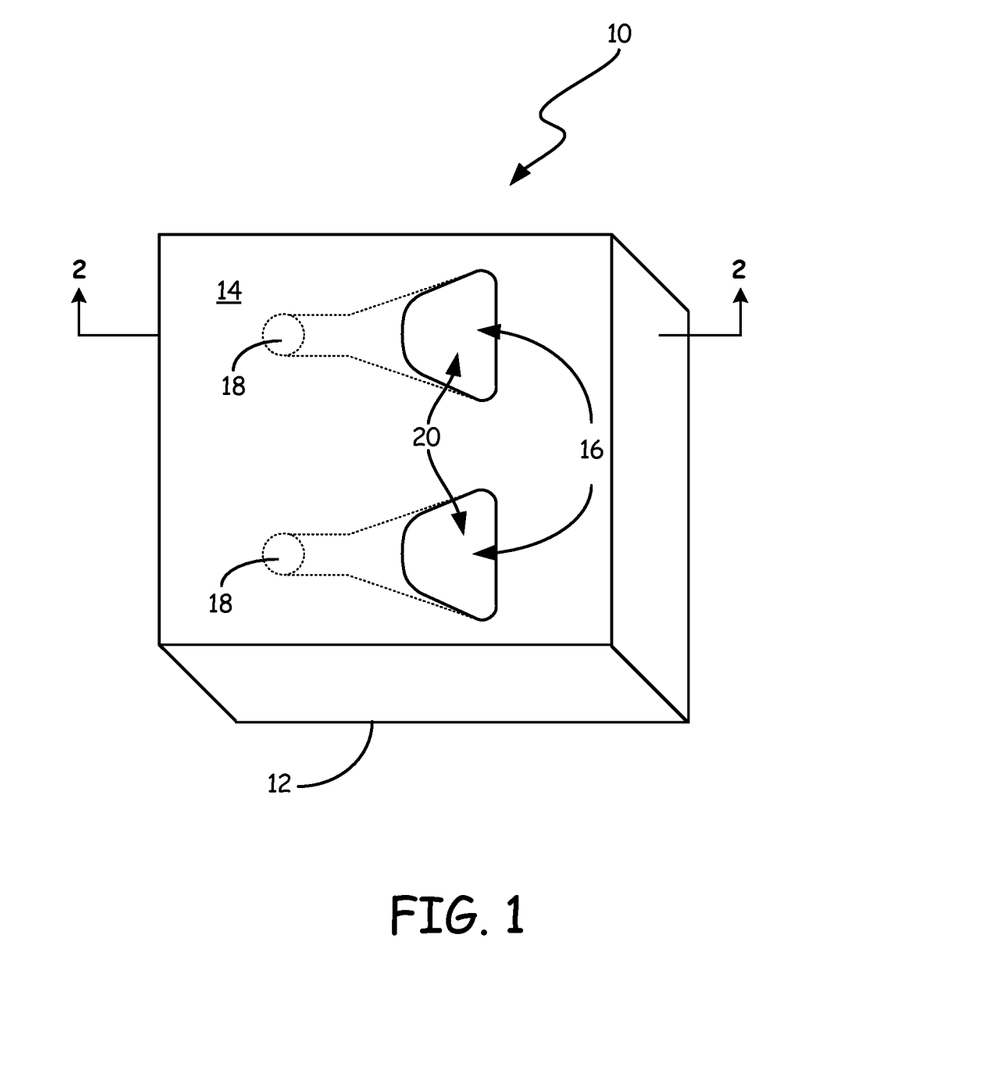
FIG. 1 is a view of a wall having diffusion cooling holes.

FIG. 1 illustrates a view of a wall with cooling holes formed according to one embodiment of the present invention. Wall 10 is primarily metallic and includes opposite surfaces 12 and 14. One or both of surfaces 12 and 14 can include a coating layer such as a thermal barrier coating. Cooling holes 16 are oriented so that their inlets 18 are positioned along surface 12 of wall 10 and their outlets 20 are positioned along surface 14 of wall 10. During gas turbine engine operation, surface 14 is in proximity to high temperature gases (e.g., combustion gases, hot air). Cooling air is delivered along surface 12 of wall 10 where it enters inlets 18 of cooling holes 16, exits outlets 20 of cooling holes 16 and forms a cooling film on surface 14. A variety of components that require cooling can include cooling holes 16. Suitable components include, but are not limited to, turbine vanes and blades, combustors, blade outer air seals, and augmentors, etc. Cooling holes 16 can be utilized on the pressure side or suction side of vanes and blades. Cooling holes 16 can also be utilized on the blade tip or blade or vane platforms.

Figure 2:
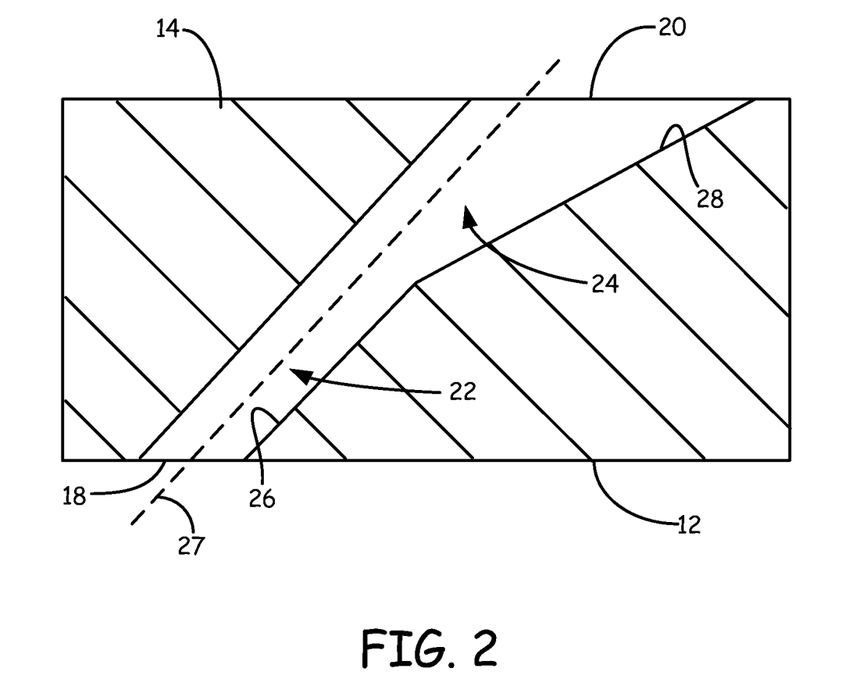
FIG. 2 is a sectional view of the diffusion cooling hole of FIG. 1 taken along the line 2-2.

FIG. 2 illustrates a sectional view of cooling hole 16 of FIG. 1 taken along the line 2-2. For the sake of comparison to later Figures, FIG. 2 illustrates cooling hole 16 before the fine features are formed along the surfaces that define cooling hole 16. Cooling hole 16 includes inlet 18, outlet 20, metering section 22 and diffusing section 24. Inlet 18 is an opening located on surface 12. Cooling air enters cooling hole 16 through inlet 18 and passes through metering section 22 and diffusing section 24 before exiting cooling hole 16 at outlet 20 along surface 14.

Figure 3:
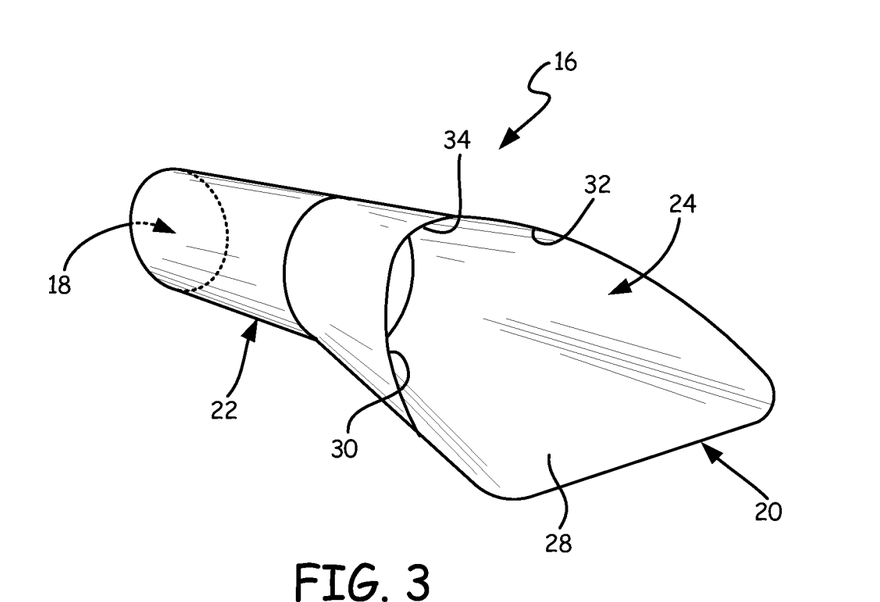
FIG. 3 is a perspective view of a diffusion cooling hole before raised features have been added.

Metering section 22 is adjacent to and downstream from inlet 18 and controls (meters) the flow of air through cooling hole 16. As shown in FIGS. 2 and 3, metering section 22 is defined by continuous, generally circular surface 26. In some embodiments, metering section 22 has a substantially constant flow area generally from inlet 18 to diffusing section 24. Metering section 22 can have circular, oblong (oval or elliptical), racetrack (oval with two parallel sides having straight portions), crescent, cusp or dual-cusp shaped cross sections. In some embodiments, metering section 22 is inclined between surfaces 12 and 14 of wall 10 as illustrated in FIG. 2 (i.e. metering section 22 is not perpendicular to wall 10). Axis 27 extends through the center of metering section 22 as shown in FIG. 2.

Diffusing section 24 is adjacent to and downstream from metering section 22. As shown in FIGS. 2 and 3, diffusing section 24 is defined by bottom surface 28, side surfaces 30 and 32 and top surface 34. As shown in FIG. 2, diffusing section 24 diverges longitudinally from axis 27 and metering section 22. Bottom surface 28 diverges longitudinally from axis 27 as it extends from surface 26 to outlet 20. As best shown in FIG. 3, diffusing section 24 also diverges laterally from metering section 22. Side surfaces 30 and 32 flare out as they extend from surface 26 to outlet 20. Cooling fluid traveling through cooling hole 16 diffuses and expands to fill diffusing section 24.

FIG. 3 is a perspective view of cooling hole 16 before the fine features are formed along one or more of the surfaces that define the cooling hole. Surfaces 12 and 14 of wall 10 are not shown in FIG. 3 so that the features of the cooling hole can be better illustrated. As shown in FIG. 3, bottom surface 28, side surfaces 30 and 32 and top surface 34 define diffusing section 24, and extend from surface 26 to outlet 20.

Cooling holes 16 shown in FIGS. 2 and 3 are typically formed by traditional manufacturing techniques in which material is removed from wall 10 to form surfaces 26, 28, 30, 32 and 34 that define cooling hole 16. Suitable methods of material removal include, but are not limited to, drilling, laser drilling, machining, electrical discharge machining (EDM) and combinations thereof. For example, metering section 22 of cooling hole 16 can be formed by drilling while diffusing section 24 of cooling hole 16 is formed by EDM. In some cases, cooling hole 16 can also be made using casting processes.

Figure 4:
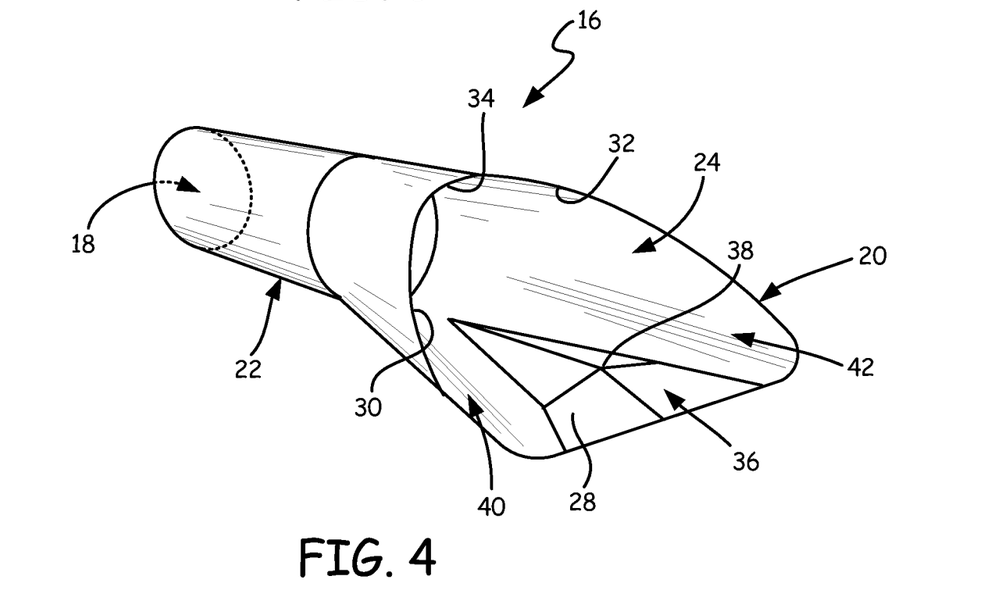
FIG. 4 is a perspective view of one embodiment of a diffusion cooling hole with features formed by additive manufacturing.

FIG. 4 illustrates one embodiment of a cooling hole with fine features. FIG. 4 is a perspective view of cooling hole 16 having raised feature 36 on bottom surface 28. Raised feature 36 is formed within cooling hole 16 by adding material to bottom surface 28. In this embodiment, feature 36 is a raised region of material located on bottom surface 28. Unlike metering section 22 and diffusing section 24, raised feature 36 cannot be easily formed by removing material from wall 10. Casting, drilling, laser drilling, machining and EDM techniques cannot typically form the geometry of raised feature 36 reliably and reproducibly or inexpensively. According to embodiments of the present invention, raised feature 36 is formed using additive manufacturing techniques.

Suitable additive manufacturing techniques for forming raised feature 36 include, but are not limited to, selective laser melting, direct metal laser sintering, selective laser sintering and electron beam melting. The additive manufacturing technique chosen can depend on the type of material used to form raised feature 36. In some embodiments, raised feature 36 is formed of a metal, alloy or superalloy. In these embodiments, any of the aforementioned techniques can be suitable. In other embodiments, raised feature 36 is formed of a ceramic material. In these embodiments, selective laser sintering is typically used to form ceramic raised feature 36. Each of these techniques involves heating a thin layer of material and melting it so that it joins with a substrate. The heating/melting and joining process can be repeated several times until the material has formed the desired raised feature 36.

More particularly, raised feature 36 is formed within cooling hole 16 by depositing a material on bottom surface 28 and selectively heating the material so that it melts and joins with bottom surface 28 following solidification. This process is repeated until the desired feature geometry and thickness has been formed. Joining the material with bottom surface 28 forms raised feature 36 as shown in FIG. 4. Depending on the type of material used to form raised feature 36 (e.g., alloy, ceramic, etc.), different deposition methods can be used. The material applied to bottom surface 28 can be a metal or ceramic powder that is sprayed or placed on bottom surface 28. Alternatively, thin layers of metal can be sequentially positioned along bottom surface 28 prior to each heating step. Metals and ceramic raw materials may also be formed into a slurry and brushed onto bottom surface 28.

Once a layer of material has been deposited on bottom surface 28, the material is selectively heated above its melting temperature so that it fuses and joins with bottom surface 28. The material is heated using a high powered laser or electron beam to deliver the energy necessary to melt the material. In some embodiments where an electron beam is used to heat the material, the entire part can be placed within a vacuum. Where the first "layer" of material is applied to bottom surface 28 (i.e. the substrate), the laser or electron beam energy may also melt part of bottom surface 28 in some cases, forming a strong bond between bottom surface 28 and raised feature 36. After the melted material has solidified, additional material is deposited and the heating process is carried out again. This series of steps (depositing, heating/melting, solidifying) is repeated until raised feature 36 contains the desired three-dimensional shape and thickness.

Prior to formation, the desired geometric characteristics of raised feature 36 are determined. These characteristics generally include the shape, thicknesses, curvature and other three-dimensional qualities of the desired feature. Once these features have been determined, a computer generates a computer-aided design (CAD) file, additive manufacturing file format (AMF) file or other type of file that provides instructions to control the additive manufacturing operation. This file contains information that controls the layer-by-layer depositing and melting process described above. In some embodiments, an additive manufacturing machine or system deposits the material within cooling hole 16 and selectively melts the material to form raised feature 36.

In cooling hole 16 shown in FIG. 4, raised feature 36 is a pyramid-like three dimensional structure. As noted above, a CAD, AMF or other file describing the geometry of raised feature 36 is generated by a computer. This file is used to control the layer-by-layer additive manufacturing process for creating raised feature 36. Raised feature 36 includes apex 38 and four relatively planar surfaces extending from apex 38 to bottom surface 28. Raised feature 36 diverts cooling air to the lateral edges of diffusing section 24, lobes 40 and 42 as shown and described in greater detail in FIG. 8 and the accompanying description in U.S. patent application Ser. No. 13/544,090, filed on Jul. 9, 2012 and entitled "Multi-lobed cooling hole".

While the formation of raised feature 36 on bottom surface 28 has been described, raised feature 36 can be similarly formed on side surfaces 30 and 32 and top surface 34 or on surface 26. Raised feature 36 can also be flat or curved as necessary to divert cooling air through cooling hole 16.

Figure 5A:
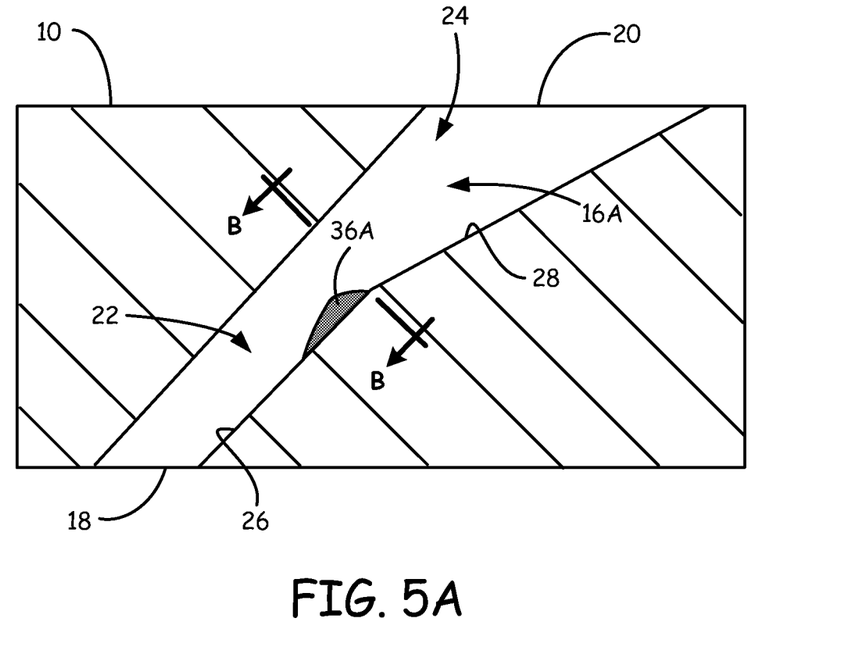
FIG. 5A is a cross section view of another embodiment of a diffusion cooling hole with features formed by additive manufacturing.
Figure 5B:
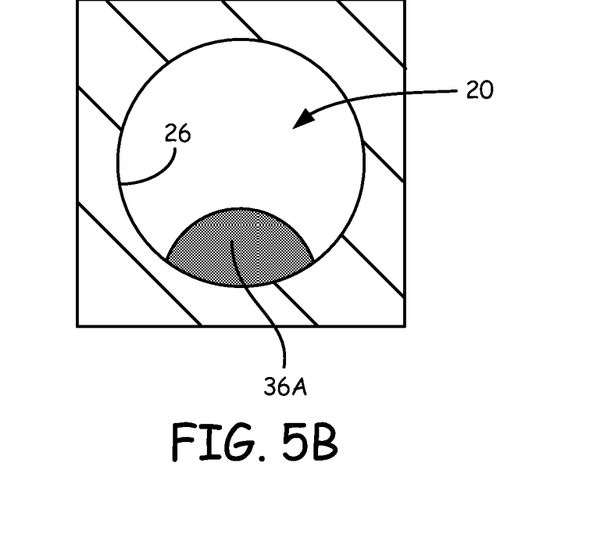
FIG. 5B is a cross section view of the diffusion cooling hole of FIG. 5A taken along the line B-B.

Additive manufacturing techniques can also be used to form other types of raised features, such as cusps in the metering section of a cooling hole. FIGS. 5A and 5B illustrate cross section views of a cooling hole and one example of raised feature 36A formed within metering section 22 of cooling hole 16A. As shown in FIG. 5A, raised feature 36A is formed near the downstream end of metering section 22 on surface 26. Raised feature 36A obstructs a portion of metering section 22 and creates a cusp-like opening as shown in FIG. 5B. Raised feature 36A obscures a line of sight between inlet 18 and outlet 20 of cooling hole 16A. Raised feature 36A cannot be easily formed by drilling or EDM methods. Thus, raised feature 36A is formed according to the additive manufacturing methods described above with respect to FIG. 4.

Figure 6:
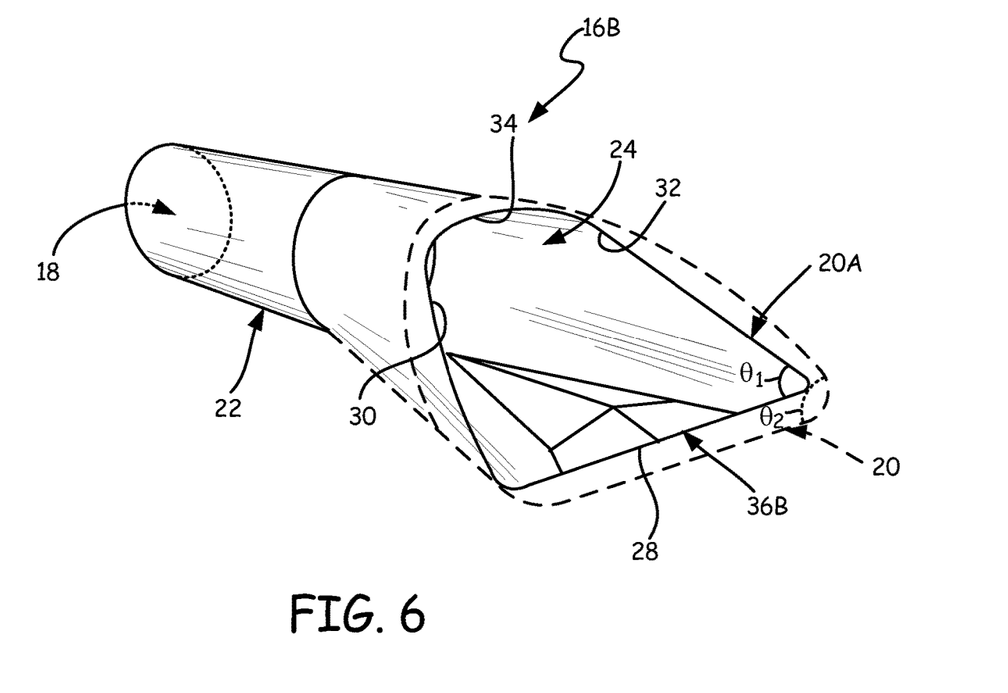
FIG. 6 is a perspective view of another embodiment of a diffusion cooling hole with features formed by additive manufacturing.

FIG. 6 illustrates another embodiment of a cooling hole having raised features formed by additive manufacturing techniques. FIG. 6 is a perspective view of cooling hole 16B having raised features 36B along all the surfaces that extend from metering section 22 to the outlet 20A (bottom surface 28, side surfaces 30 and 32 and top surface 34). Cooling hole 16B appears similar to cooling hole 16 shown in FIG. 4. The dashed lines near outlet 20A illustrate the location of outlet 20 in FIG. 4. In this embodiment, additional material has been added to bottom surface 28, side surfaces 30 and 32 and top surface 34 along and near outlet 20A to provide a cooling hole with "sharper corners". As noted above, a CAD, AMF or other file describing the geometry of raised feature 36B (the difference in distance between outlet 20 and outlet 20A) is generated by a computer. This file is used to control the layer-by-layer additive manufacturing process for creating raised feature 36B that reduces the angle of the corners of outlet 20.

Wide corners reduce the thermal mechanical fatigue of wall 10 while sharp corners reduce the likelihood of flow separation of cooling air exiting diffusing section 24, thereby improving cooling effectiveness. Cooling holes can be fine tuned to contain wide corners, sharp corners, or a combination of both wide and sharp corners along the outlet to fit the specific needs based on the cooling hole location. As shown in FIG. 6, the angle of the corner near the juncture of side surface 32 and bottom surface 28 shown before material was added to side surface 32 and bottom surface 28 (i.e. at outlet 20) ($\theta_2$) is greater than the angle of the corner near the juncture of side surface 32 and bottom surface 28 at outlet 20A ($\theta_1$). Thus, the additional material added to the surfaces forms a sharper corner where side surface 32 and bottom surface 28 meet, reducing the chance of flow separation at that corner.

While FIG. 6 shows an embodiment in which all of the surfaces at outlet 20A include additional material, additional material can be added to as few as one of the surfaces in other embodiments.

Discussion of Possible Embodiments

The following are non-exclusive descriptions of possible embodiments of the present invention.

A method for forming a diffusion cooling hole in a substrate can include removing material from the substrate to form a metering section having an inlet on a first side of the substrate and removing material from the substrate to form a diffusing section that extends between the metering section and an outlet located on a second side of the substrate generally opposite the first side. The method can also include forming a feature on a substrate surface within one of the metering section and the diffusing section. Forming the feature can include depositing a material on the substrate surface and selectively heating the material to join the material with the substrate surface and form the feature.

The method of the preceding paragraph can optionally include, additionally and/or alternatively, any one or more of the following features, configurations and/or additional components:

A further embodiment of the foregoing method can include that the steps of removing material from the substrate to form a metering section and removing material from the substrate to form a diffusing section are performed by a technique selected from the group consisting of casting, drilling, laser drilling, machining, electrical discharge machining and combinations thereof.

A further embodiment of any of the foregoing methods can include that the substrate surface on which the feature is formed is located within the metering section.

A further embodiment of any of the foregoing methods can include that the feature obscures a line of sight between the inlet and the outlet.

A further embodiment of any of the foregoing methods can include that the feature obstructs a portion of the metering section to form a cusp-like opening.

A further embodiment of any of the foregoing methods can include that the substrate surface on which the feature is formed is located within the diffusing section.

A further embodiment of any of the foregoing methods can include that the feature includes an apex and a plurality of planar sides extending from the apex.

A further embodiment of any of the foregoing methods can include that the feature is formed along a surface of the substrate adjacent the outlet.

A further embodiment of any of the foregoing methods can include that the outlet before forming the feature includes a corner having a first angle, and wherein the feature forms a second corner having a second angle generally smaller than the first angle.

A further embodiment of any of the foregoing methods can include that the feature is formed along substantially all of the substrate surfaces adjacent the outlet.

A further embodiment of any of the foregoing methods can include that the material deposited on the substrate surface is a metal.

A further embodiment of any of the foregoing methods can include that the material deposited on the substrate surface is a ceramic.

A further embodiment of any of the foregoing methods can include that the material deposited on the substrate surface is selectively heated using a laser.

A further embodiment of any of the foregoing methods can include that the material deposited on the substrate surface is selectively heated using an electron beam.

A further embodiment of any of the foregoing methods can include that the material is deposited on the substrate surface by spraying.

Although the present invention has been described with reference to preferred embodiments, workers skilled in the art will recognize that changes may be made in form and detail without departing from the spirit and scope of the invention.

The invention claimed is:

1. A method for forming a diffusion cooling hole in a substrate, the method comprising:
   removing material from the substrate to form a metering section having an inlet on a first side of the substrate, the metering section extending along an axis;
   removing material from the substrate to form a diffusing section that extends between the metering section and an outlet located on a second side of the substrate generally opposite the first side, the diffusing section partially defined by a bottom surface abutting a downstream end of the metering section and diverging laterally therefrom; and
   forming a feature on a surface within the metering section on a metering section surface abutting the bottom surface of the diffusing section, wherein the feature obstructs a portion of the metering section to form a crescent-shaped opening, and is positioned to obscure a line of sight between the inlet and the diffusing section;
   wherein forming the feature comprises:
      depositing a material on the surface;
      selectively heating the material to join the material with the surface and form the feature.

2. The method of claim 1, wherein the steps of removing material from the substrate to form a metering section and removing material from the substrate to form a diffusing section are performed by a technique selected from the group consisting of casting, drilling, laser drilling, machining, electrical discharge machining and combinations thereof.

3. The method of claim 1, wherein the material deposited on the surface is a metal.

4. The method of claim 1, wherein the material deposited on the surface is a ceramic.

5. The method of claim 1, wherein the material deposited on the surface is selectively melted using a laser.

6. The method of claim 1, wherein the material deposited on the surface is selectively melted using an electron beam.

7. The method of claim 1, wherein the material is deposited on the surface by spraying.

* * * * *